March 11, 1969 H. BILLING ETAL 3,432,817

APPARATUS FOR INFORMATION STORAGE WITH THIN MAGNETIC FILMS

Filed July 18, 1963 Sheet 1 of 5

United States Patent Office 3,432,817

Patented Mar. 11, 1969

3,432,817

APPARATUS FOR INFORMATION STORAGE WITH THIN MAGNETIC FILMS

Heinz Billing, Munchhausenstrasse 12; Albrecht Rudiger, Widenmayerstrasse 24; and Karl-Heinz Gundlach, Elisabethenstrasse 75, all of Munich, Germany Filed July 18, 1963, Ser. No. 296,030

Claims priority, application Germany, July 24, 1962, M 53,676; Mar. 15, 1963, M 56,122, M 56,123

U.S. Cl. 340—174 8 Claims

Int. Cl. G11b *5/00;* B44d *1/18*

ABSTRACT OF THE DISCLOSURE

Thin-film magnetic information storage elements (and methods of fabrication), comprising arrays such as spots or strips of magnetic thin-film material and conductors traversing said arrays; the thin-film material having, in addition to two stable remanence conditions in the "easy" magnetic direction, two other stable remanence conditions, in or opposite to a "hard" direction. Film domains may result from magnetic or thermal treatment, juxtaposition of different materials, or otherwise, and both planar and 3-dimensional arrays are contemplated.

Figure 1:
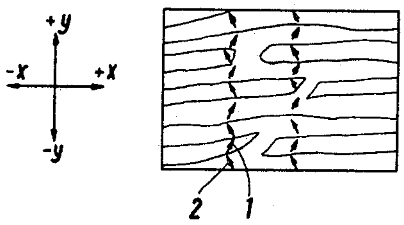

This invention concerns apparatus for storing information with thin magnetic films and relates especially to a storage element which consists of a thin magnetic film. The invention further concerns a storage matrix constructed of such elements and methods of constructing the elements and stores and also operational methods for writing or reading bits of information in such a storage element or matrix.

It is known that thin magnetic films offer the prospect of developing large, relatively cheap stores of short access time. A review of the state of the art is given for example in the article by W. Kayser in the journal, "Elektronische Rechenanlagen," vol. 2, 1962, pages 60 to 70 with the title "Übersicht über Speicherverfahren für Speicher mit dünnen magnetischen Schichten—Storage Techniques for Thin Magnetic Films." This article include references to many English-language papers.

The magnetic films, which usually consist of a nickel-iron alloy, e.g. 80% nickel and 20% iron, are provided during their production with a preferred direction in the plane of the film. In the following description it will always be taken that the preferred or easy direction coincides with the X-axis of a rectangular coordinate system. The preferred direction is mostly developed by heating the film above 300° C. in an external magnetic field for a time. It is annealed in that direction in which the magnetic vector lies during the annealing. In all such known stores, the criterion taken for storage of a bit in the film is whether the magnetization remains after writing in the positive or negative preferred direction of magnetisation. This gives two stable states.

As is explained in the above-mentioned work, there are two possibilities for controlling a storage matrix which consists of a large number of dot-like magnetisable films arranged in rows and colums. One can either operate with word-selection by means of field-coincidence or with direct word-selection. In the case of large stores, word-selection by field-coincidence is essentially less expensive and therefore to be preferred. Direct word selection requires a conductor individual to each word.

For word-selection by field-coincidence it is essential to arrange that neither of the partial or component fields by itself shall produce, even after repeated application, any material irreversible alteration of the magnetisation of the dots affected. However the two fields in coincidence must effect a coherent reversal of magnetisation.

In the case of direct word-selection the requirements on the magnetic characteristics of the films are less stringent, since one component field which affects all bits of the word (but no other dots) can be as strong as required and only the second component field must by itself produce no irreversible changes. The coincidence of both partial fields must again effect a coherent reversal. Storage matrices operating in accordance with this second technique have already been constructed.

Word-selection by field-coincidence has not yet been effective with the magnetic films available to date since the cumulative effect of all disturbing effects has not permitted a fulfilment of the practical requirements. The disturbing effects are principally the domain growth effect and wall movements, incomplete rotational switching and finally differences between the characteristics of individual dots in a matrix.

It is known that many magnetic films with preferred directions in the film plane possess two further quasi-stable states of magnetisation besides the two stable states in the positive and negative X-direction. These two quasi-stable states lie perpendicular to the preferred direction, that is in the so called hard or Y direction.

The basis for these two quasi-stable states appears from the following observation: If one magnetises a film with a field $H_y$ which is stronger than the aniseotropic field strength $H_k$, the magnetisation rotates into the hard direction. When the field $H_y$ is switched off, initially in many domains of the film the magnetisation rotates clockwise to the +X-direction and in the other domains counter-clockwise to the −X direction. Both domain groups quickly block each other through their stray fields with the formation of blocking walls as represented for example in FIG. 1 of the accompanying drawings. The resultant magnetisation remains approximately in the hard +Y-direction even though its absolute value is somewhat reduced. This magnetic state of the film will be designated "blocked +Y-state in the following. By means of a field impulse $-H_y$ in the opposite direction, the magnetisation can be brought to correspond with the blocked −Y-state.

The basic concept of the present invention is to use stable states of magnetisation in the positive and negative *hard* direction to characterise the two binary values 0 and 1.

According to the present invention therefore, there is provided a binary storage element utilizing a thin magnetic film which has a preferred or easy direction and also a hard direction in the film plane, and conductors adjacent the film for applying external magnetic fields thereto, characterised in that the storage in the film of the two binary values respectively is represented by magnetisation in the positive and negative hard direction.

Preferably magnetic films or magnetic films dots are used in which the direction of resultant magnetisation after switching off the external field remains in this quasi-stable state through the mutual blocking of the domains to a good approximation. The employment of this effect, hitherto regarded as a interfering effect for storing the individual bits in the storage elements has the advantage that it is possible to construct a more reliable matrix with word-selection by means of field-coincidence and also that the technique of writing and reading the information can be made far-reachingly simpler and more reliable.

For writing or reading bits in a storage element of this kind the element can be simultaneously subjected for example to an impulse field in the hard direction as main pulling field and a smaller field transverse thereto. For reading a bit, a positive and a negative impulse in the hard direction can be successively applied whilst a transverse impulse extending over both these is also applied. For writing a bit a positive and negative impulse field in the hard direction can be applied in succession, a transverse field being used to determine which of the impulses is effective to write in information.

In order to generate the fields it is suficient for one conductor to cross the film in the easy direction for generating the pulling or pushing field and other conductors to cross the film in the hard direction, one for generating the transverse field and one for read-out. Throughout this specification and claims pulling and pushing fields refer respectively to fields in the Y-direction having the same and opposite sense as the existing magnetisation of the film when the film is already stably magnetised in the Y-direction.

As will be explained more fully below, it can be advantageous, if the annealed-in preferred direction of the film is twisted alternately in one or the other sense in strips running parallel to the mean preferred direction so as to be at an angle to the mean preferred direction which angle is made greater than the unavoidable variations of the easy direction arising within the strip on account of local disturbances. Such a formation of the film has the advantage that it is not necessary to keep the switching fields completely parallel to the hard axis of all dots of a storage matrix. Angular deviations can be tolerated within certain limits. In further course of the description a method will be given adapted especially for the production of such films.

These films may be said to have a ripple in the preferred direction. This ripple may be annealed in by applying to the film during heating what will be called a "strip matrix" of permanent magnetic material which sets up as explained more fully hereinafter field components transverse with respect to the said mean direction but alternating in sense from strip to strips.

Thus these subsidiary developments of the invention make possible a thin magnetic film in which the writing of a bit in the block Y-state is possible over a relatively wide range of angles and in which the blocked Y-state is characterised by a relatively high degree of stability. This means that the magnetisation in the block Y-state should stay in the face of small disturbances and not swing into the easy direction.

A further object of a subsidiary feature of the invention is a thin film which can be used for all writing and reading techniques which have already been mentioned above, but which in addition makes possible a three-coordinate calling-up or selection of information during reading. Furthermore, such a thin magnetic film should be relatively easy to produce.

This is attained in a subsidiary development of the invention in that the thin magnetic film is provided with differing closely adjacent strip-like regions, orientated in the easy direction, and which differ in the energy barrier which has to be overcome in bringing the magnetisation vector firstly into the positive easy direction and finally through rotation into the negative easy direction. The energy barrier is alternately higher and lower going from strip to strip. (It should be noted, that the rotation of magnetic vector mentioned above only serves to determine the energy changes in the strip-like regions and hence such of their characteristics in which the strip-like regions are required to differ. The states of the magnetic vectors used to characterise the storage of information and the movements of these vectors involved in writing and reading bits have been indicated broadly above and will be further clarified below.)

Thus the strip-like regions of the thin magnetic film belong alternately to one or the other of two types differing in their magnetic characteristics. The defferences in the magnetic characteristics can be imposed by means of different cross-sections, by means of different saturation magnetisations or by means of different uniaxial anisotropy in the easy direction. The energy change is greater in those strips having a larger cross-section or a higher saturation magnetisation, in which case there is a higher saturation flux. If strips with different anisotropy are used, the energy change is higher in those strips having the higher uniaxial anisotropy.

Such strip-like regions in thin magnetic films may be attained for example by applying to a film of uniform thickness of a magnetically soft material such as an alloy of approximately 80% nickel and 20% iron, closely adjacent bands of the same material, this being possible for example by means of vapour deposition through a masking grid. Thereby arise differences in the cross-section of adjacent strip-like regions of the film and hence difference in the magnetic flux. One can however also alternate closely adjacent thin strips of two different materials which differ in their saturation properties.

With these thin magnetic films all the reading and writing techniques for bits of information which have been mentioned above can be carried out. In this it is valuable to subject these thin films in addition to above-mentioned impulse fields to a steady magnetic field in the negative easy direction. Furthermore it is valuable to form the impulse fields by combining a plurality of partial fields in accordance with the laws of vector addition.

For preference, in the case of these last-mentioned thin films, the writing and reading of bits is effected using magnetic impulse fields of such magnitude and direction, that the components of the magnetisation vectors which lie in the easy direction change their sign in the strip-form regions with lower energy barrier but keep their sign in the regions with higher energy barrier.

In order to obtain acceptable results in the above-mentioned method of annealing in a "ripple" in the preferred direction, the thin magnetic film and also the strip-matrix of permanent magnetic material must be applied to an extraordinarily plane or flat substrate. Good results in annealing can only be attained if the distance between the thin magnetic film and the strip-matrix of permanent magnetic material is overall less than 0.5 to $1\times10^{-3}$ cm. There are difficulties in preparing cheaply such substrates with sufficient accuracy, this requirement necessitates an absolutely dust-free working atmosphere. Dust particles already exceed the limits given above.

It is therefore a further object to provide a method of annealing-in a magnetic ripple in a thin magnetic film which yields acceptable results but in which the requirements on the accuracy of the substrate or the film and the strip-matrix, as well as the requirements with respect to purity during the carrying out of the method are smaller.

This is attained in another subsidiary development of the invention in which, on a thin magnetically soft film a further thin film is deposited which is soluble in a solvent which does not affect the magnetic film, closely adjacent thin strips of a magnetically hard material oriented in the preferred direction are applied on this second, soluble film, whereafter the magnetically hard thin strips are magnetised perpendicular to the preferred direction, preferred directions then being annealed into the thin magnetic film under the additional influence of a permanent magnetic field in the preferred direction, and after the annealing the second thin film comprising the permanent magnetic strips is removed in a solvent.

The magnetically soft layer can again consist of an alloy of approximately 80% nickel and 20% iron. The second, soluble layer can be water-soluble. It can, for example, be of common salt. This second, soluble layer is applied for example by vapour deposition but can also be electrolytically deposited. The magnetically hard material can be cobalt for example: it can be applied by vapour deposition through a masking grid. Electrolytic deposition is also possible.

If the layers are deposited electrolytically, care must be taken that the second, soluble layer, does not go into solution in the electrolyte. A material can be used for this layer which, for example, is deposited from an aqueous electrolyte but can be dissolved in an organic solvent or at another pH value.

Further features and characteristics of the invention will be apparent from the following description given by way of example with reference to the accompanying drawings.

Figure 2:
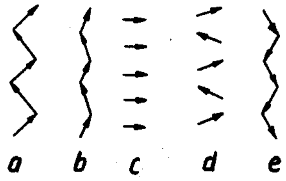
Figure 3:
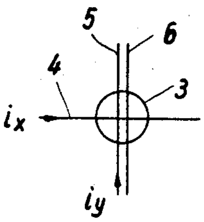
Figure 4:
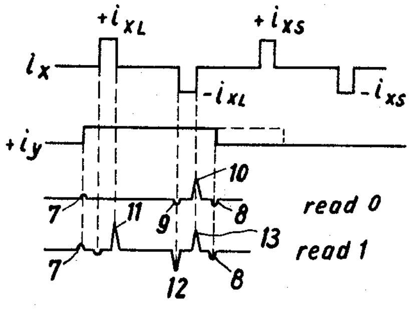
Figure 5:
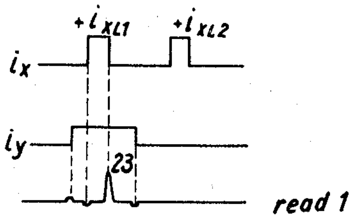
Figure 6:
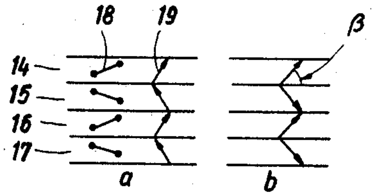
Figure 7:
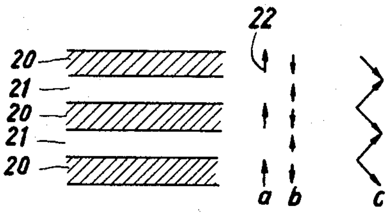
Figure 8:
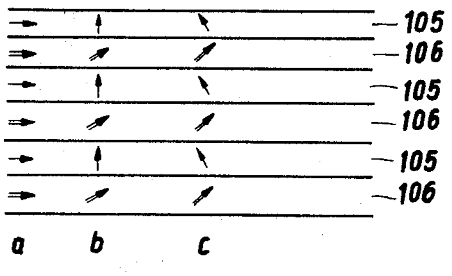
Figure 9:
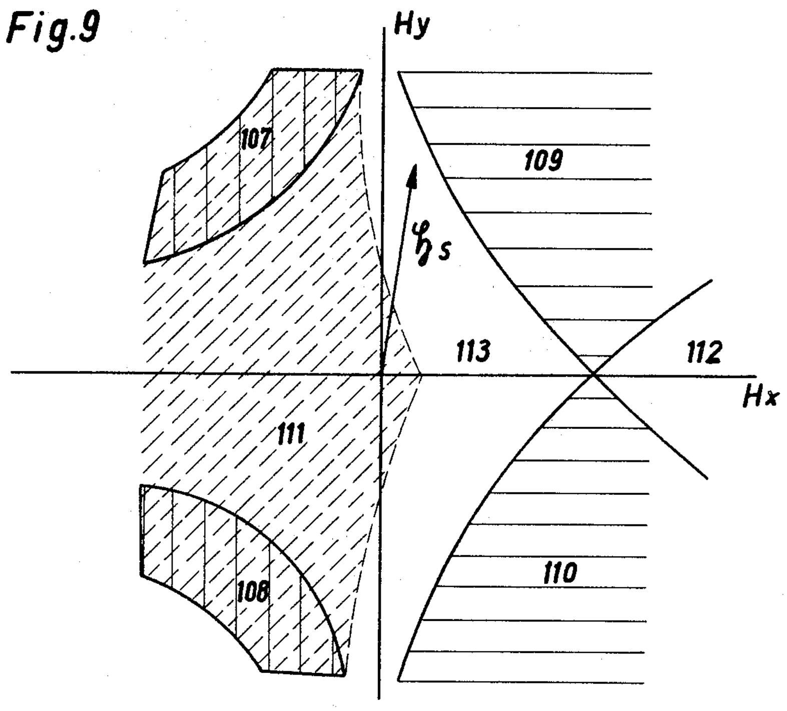
Figure 10:
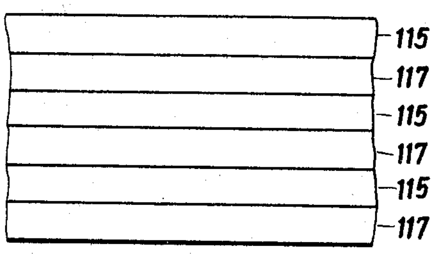
Figure 11:
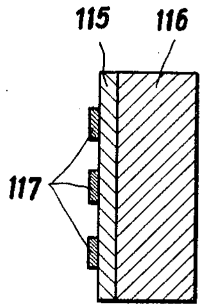
Figure 12:
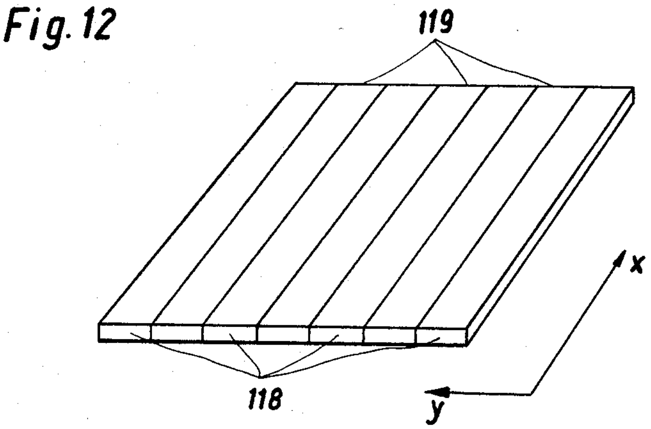
Figure 13:
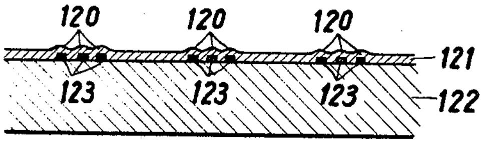
Figure 14:
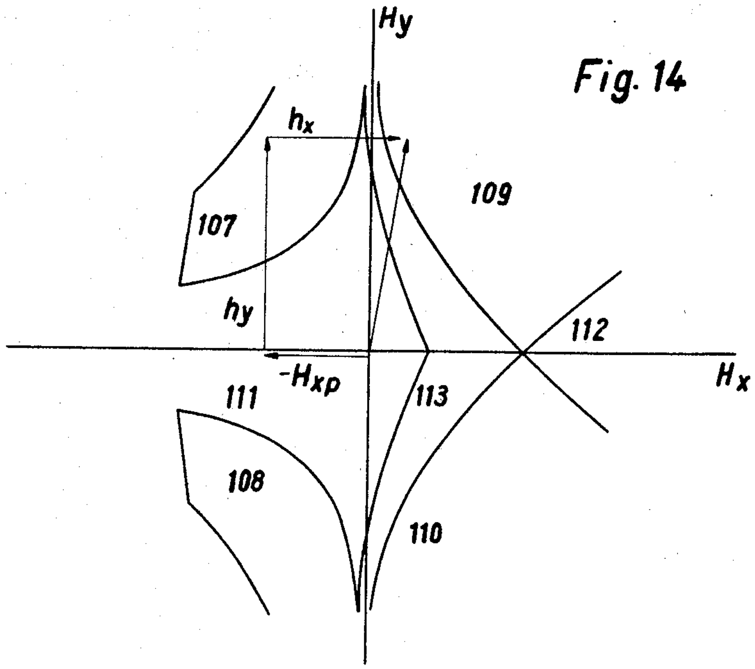
Figure 15:
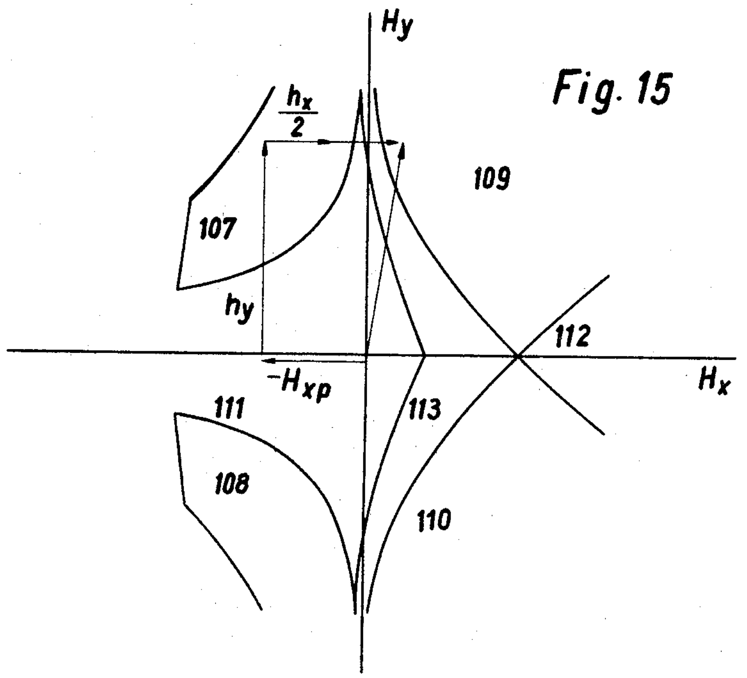
Figures 16, 17:
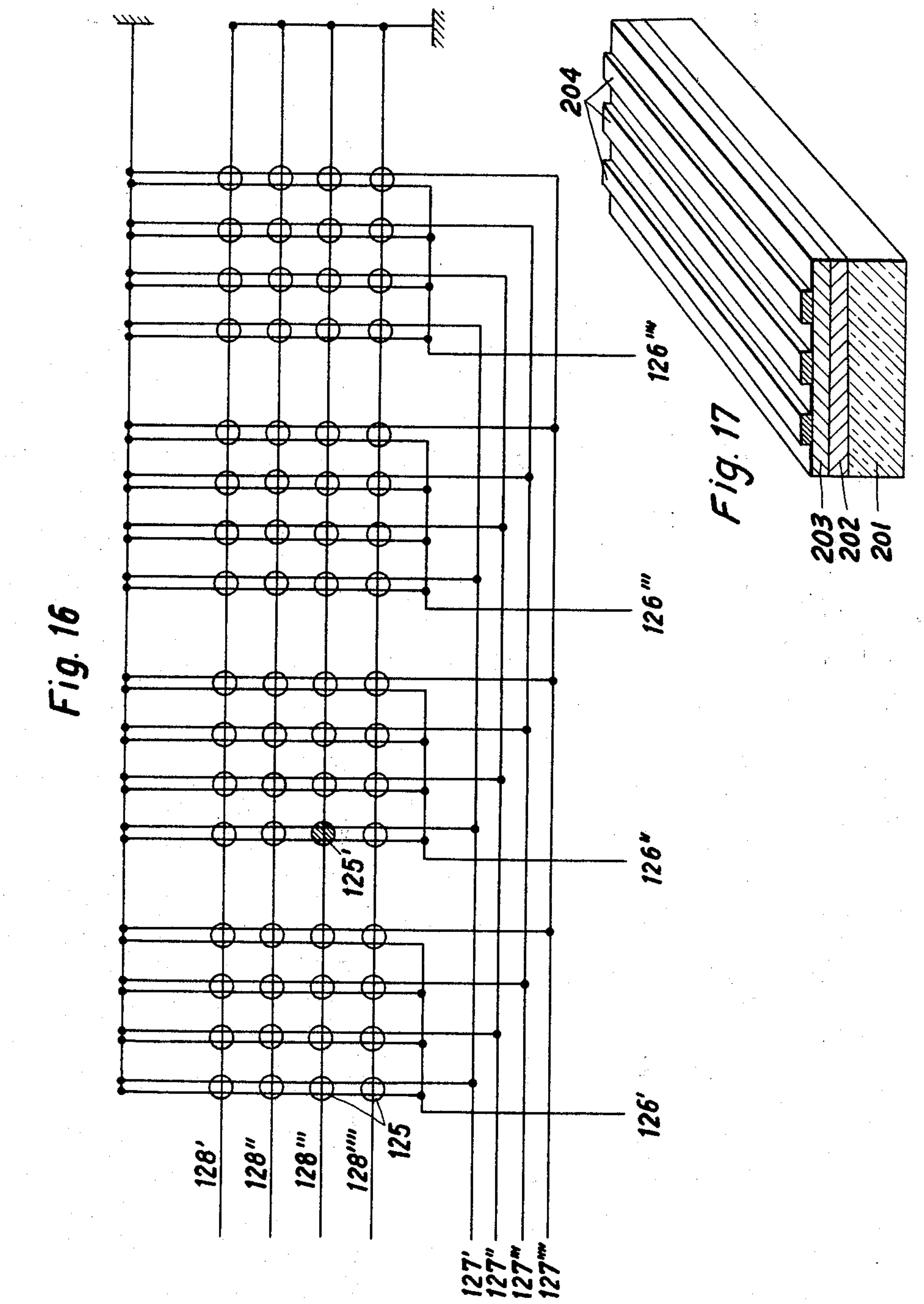

In the drawings:

FIG. 1 is a schematic representation of the magnetic domain structure and the state of magnetisation in the blocked +Y-state, FIG. 2 shows the magnetisation vectors for different states of magnetisation, FIG. 3 shows a magnetic film in the form of a round dot crossed by conductors, FIG. 4 shows writing and reading impulses plotted against time, FIG. 5 shows impulses, which can be used for non-destructive read-out, FIG. 6 shows a part of a magnetic film with strips running parallel to the mean preferred direction, FIG. 7 shows a part of an applied strip-matrix of magnetically hard material, FIG. 8 is a schematic representation of a thin magnetic film embodying the invention, FIG. 9 is a diagram of the magnetic states of the film according to FIG. 8, FIGS. 10 and 11 are respectively a plan and transverse section of a thin magnetic film embodying the invention, FIG. 12 is a perspective view of a thin magnetic film and represents another embodiment of the invention, FIG. 13 is a section through a thin magnetic film forming another embodiment of the invention, FIG. 14 is a diagram of magnetic states required to clarify the writing and reading of information in the thin film store, FIG. 15 is another such diagram serving to clarify a three-coordinate calling-up selection of information, FIG. 16 is a schematic circuit diagram of storage matrix with which a three-cordinate selection of information is possible, and FIG. 17 shows the construction of a thin magnetic film which is prepared for annealing in preferred directions.

If one examines more closely a film as represented sectionally in FIG. 1 which can be blocked in the hard direction, the following characteristics result as important for obtaining reversal, that is for writing in or reading out of bits.

The magnetisation of a film blocked in the +Y direction can be rotated coherently into an easy direction by simultaneously applying an impulse field $+H_y$ greater than $H_k$ and a smaller transverse field $H_x$, say $+H_x$ for example. The field $+H_y$ directs the magnetisation vectors of the domains represented by arrows 1 and 2 in FIG. 1 firstly in the +Y direction. In FIG. 2 these magnetisation vectors are represented and, taking FIG. 2*a* as the initial state, a pulling takes place on application of the field $+H_y$ whereby the vectors take up the form of FIG. 2*b*. Therefore a magnetic field $H_y$ applied in the direction of the existing net magnetisation of the film is designated a pulling field. On reducing the pulling field to zero value with simultaneous application of a transverse field $+H_x$, the magnetic vectors of all the domains rotate coherently into the easy direction +X, so that the condition of FIG. 2*c* is obtained. For this process a field $H_x$ is sufficient which by itself even on repeated application results in no irreversible magnetisation changes.

If a film blocked in the +Y-direction is subjected to an impulse filed-$H_y$ (again with $H_y$ greater than $H_k$), during the filed impulse all magnetic vectors of the domains are turned further into the ±X-directions, i.e., they are disposed as illustrated in FIG. 2*d*. A magnetic field $-H_y$ which is opposed to the existing net magnetisation is therefore designated a pushing field. The energy stored in the walls bounding the domains returns the magnetisation to the state of FIG. 2*a* on switching off the pushing field $-H_y$. This happens independently of whether a transverse field $H_x$ exists or not.

A field impulse $+H_y$ without a simultaneous transverse field takes the magnetic state from that according to FIG. 2*a* to that of FIG. 2*b* and at the end of the impulse the state reverts to that of FIG. 2*a*.

A field impulse $+H_y$ or $-H_y$ rotates the magnetisation coherently from the easy +X-state of FIG. 2*c* (or from the −X-state) into the blocked +Y- or −Y-state of FIG. 2*a* or FIG. 2*e* as the case may be.

If the impulse field $+H_y$ is applied during a sufficiently short interval, e.g. only $10^{-8}$ second, it is possible to find field strengths which on the one hand are sufficient as pulling fields to rotate the magnetisation coherently from the easy to the blocked state or, when the transverse field $H_x$ is simultaneously applied from the blocked +Y-state into the easy state but which on the other hand are not so great when acting as a pushing field perceptibly to change the magnetisation of a film blocked in the −Y direction irreversibly into the +Y direction.

In previously known films there were difficulties in finding a field impulse $H_y$ which was sufficient as a pulling field but gave rise to no irreversible magnetisation when repeatedly active as a pushing field. If however a magnetic film dot is subjected to equal numbers of alternating pulling and pushing field impulses $\pm H_y$ of equal absolute magnitude, no essential irreversible magnetisation changes appear after indefinitely large numbers of impulse pairs.

In consideration of these difficulties, the following technique is used to read the information from a matrix constructed from dot-form films, which will be more fully described with reference to FIG. 3. The circle 3 represents one magnetic dot of a matrix, of which the easy preferred direction lies along the X-axis.

Rectangularly arranged wires 4, 5 and 6 serve for selection. The current $i_x$ flowing through the wire 4 produces the field $H_y$ at the dot location. The current $i_y$ flowing through the wire 5 produces the field $H_x$. The read wire 6 runs paralel to the hard direction.

The impulse program shown in FIG. 4 can be used for reading. The magnetisation of the dot is initially in the blocked state, the state +Y representing 1 whilst the state −Y represents 0. The upper line characterises the current flow in the conductor 4, the second line the current flow in the conductor 5, whilst the third line shows the voltage waveform in the conductor 6 for the case of reading zero and the fourth line shows the voltage waveform in the conductor 6 for the case of reading 1.

At the beginning of the first current pulse $+i_y$, the magnetisation is reversibly rotated a small amount in the +X-direction and at the end of this impulse reverts to the Y-direction. This induces at these times the disturbing or noise pulses 7 and 8. If the dot stores a 0, the first current impulse $+i_{x1}$ generated a pushing field. The X-component of the magnetisation is therefore not altered and the Y-component only reversibly. Therefore the pushing field generates no read signal. The second impulse $-i_{x1}$ generates a pulling field. It rotates the magnetisation back again into the −Y-direction and thereby generates a small "noise" signal 9 in the read wire 6. At the end of the second pulse $-i_{x1}$, the magnetisation rotates into the easy direction under the continuing effect of the field $H_x$. This produces a large output signal 10 in the read wire 6.

If a 1 is stored in the dot, the first impulse $+i_{x1}$ is already a pulling field. At the end of this pulse the magnetisation rotates to the easy direction. Therefore the first read signal 11 appears. The second pulse $-i_{x1}$ rotates the magnetisation into the $-$Y-direction. At the end of the $-i_{x1}$ pulse the magnetisation reverts to the +X-state since the tranverse field $H_x$ is still applied. Therefore the read signals 12 and 13 are generated. The read signals 11 or 12 can be used to identify the information. At the end of the reading program, the magnetisation is rotated to the $-$X-direction by the coincident fields at the selected dot independently of the previously stored information. The magnetisation of all other dots remains uninfluenced in the +Y-state or $-$Y-state.

In order to write the information 1 or 0 into a dot directly after reading it is sufficient to pass a current impulse $+i_x$ or $-i_x$ through the wire 4, $i_y$ being maintained at zero. Since only a dot which has just been read is in the unblocked state, only such will be influenced and have its magnetisation brought into the desired state. This technique is however unfavourable since on searching a matrix it will occur, according to the particular sequence of stored information, that unvisited dots of the matrix row will be subjected to an unequal number of positive and negative $H_y$ impulses. The programme given in FIG. 4 therefore serves for writing, with a second pair of $\pm i_x$ impulses following reading. These are characterised as $\pm i_{xs}$. In order to write in a 1 current $i_y$ is switched off immediately after the reading procedure. This is represented in the second waveform by the full line; in this case the $+i_{xs}$ impulse serves for writing whilst the second impulse $-i_{xs}$ merely generates a pushing field and remains without influence. In order to write in a zero the current $i_y$ is only switched off after the impulse $+i_{xs}$, as is indicated by the broken line in the second waveform. At the end of the $+i_{xs}$ impulse the magnetisation reverts to the easy +X-state. The impulse $-i_{xs}$ finally effects the writing in of the information.

In the above described method, the information stored in the dot is lost in the reading process. If this must be retained it must be thereafter rewritten. For this it is necessary to use the signal which has been read to control the rewriting process.

The described characteristics of the dot permit reading without destruction to take place in the following manner explained with reference to FIG. 5. Two current impulses $+i_{x1}$ are sent one after the other through the conductor 4, of which only the first pulse is overlapped by a transverse field impulse $+i_y$. If a 1 is stored in a dot, the first impulse $+i_{x11}$ acts as a pulling impulse and the magnetisation rotates on account of the transverse field finally into the easy direction, generating thereby a read signal 23. If however a zero is stored, the first impulse $+i_{x11}$ acts as a pushing impulse and the state of the dot undergoes no irreversible alteration in magnetisation. The zero therefore remains stored. No reading signal is obtained. The second impulse $+i_{x12}$ acts in the latter case merely as another pushing impulse and therefore does not influence the stored zero irreversibly. In the first case it writes in a new 1 since the magnetisation of the dot was previously rotated into the easy direction. In this manner the original state of the dot is produced again after the second impulse $+i_{x12}$ without the read signal being necessary for rewriting. This effects an appreciable acceleration of the reading process.

In order to subject the dot to an equal number of $+i_{x1}$ and $-i_{x1}$ impulses, two impulses $-i_{x1}$ can be caused to follow. This is however not necessary with magnetic dots whose characteristics are improved in accordance with the method described in the following.

A large number of magnetic films vapour deposited under varied conditions and of varied thicknesses and compositions have been investigated as to their suitability for the described storage procedure. In this the following difficulties have been seen. In order to obtain blocking, the pulling field must be within about plus or minus 2° to the perpendicular to the easy direction of the dot. Since there are difficulties even to anneal-in the easy axis to within such a small angular tolerance wtihin a dot in all regions, there are mostly some regions which remain unblocked after a pulling field. These regions yield undesired disturbance signals when reading the information. Furthermore, it appears that the pulling field and the pushing field must correspond with one another in magnitude to within about 5% since otherwise, even with the pair-wise use of pulling and pushing pulses, several thousands to ten-thousands of pairs can destroy the information which has been written in.

When a whole storage matrix with very many dots is constructed it can happen that the individual dots differ in their characteristics somewhat among each other. Furthermore, it is difficult to generate the switching field $H_y$ sufficiently parallel to the hard axis of all dots in the whole matrix. In order to avoid these difficulties it is possible to improve the magnetic characteristics of the film by means of an annealing technique described further below such that the direction of the pulling field for setting up the blocking in the whole film can have a greater angular tolerance and that the permissible pushing field can be made appreciably greater than the necessary pulling field.

In this further development of the invention the following considerations apply:

The previous difficulties resulted from the fact that it is not possible to anneal in the preferred direction in all domains of a dot exactly parallel to one another in consequence of unavoidable local disturbances. This has the result that in blocking the dot breaks up into more or less large domains whose boundaries, as shown in FIG. 1, only in the average run parallel to the easy direction. At the boundaries of the larger domains the undesired irreversible change of magnetisation appears in the presence of pushing fields. In order to avoid this breaking up into regions of varying size and to avoid obliquely running boundaries a so-called ripple of the easy direction is annealed into the film so that, in strips running parallel to the mean preferred direction, the preferred direction alternates from strip to strip clockwise and counterclockwise, being rotated through an angle $\epsilon$.

A favorable strip breath is a dimension of approximately 10 $\mu$m. and a favourable angle is approximately 10°. The angle $\epsilon$ should be greater than the deviations of the easy direction which are unavoidable within a strip on account of local disturbances. FIG. 6 shows schematically for a part region of a film the strips 14, 15, 16 and 17 and the preferred directions marked by the lines 18. The arrows 19 are the magnetisation directions following a $+H_y$ impulse.

As above-mentioned, a preferred direction can be annealed into the film when the film is heated in a magnetic field above 300° C. The preferred direction however is annealed-in in that direction in which the magnetisation at each point of the film is directed during the annealing. In order to anneal in the striation or ripple according to FIG. 6 the film must be subjected during the heating to an inhomegenous external magnetic field whose direction as shown in FIG. 6*b* alternates from strip to strip with such positive and negative angles $\beta$ with respect to the X axis that the magnetisation in the film is rotated by the desired angles $\pm\epsilon$. The stray fields emanating from the magnetic vectors of the individual strips of the dot which influence the adjacent strips make it necessary to make the angle $\beta$ greater than the desired ripple angle $\epsilon$. Only in the case of infinitely thin magnetic films would $\epsilon$ equal $\beta$.

In order to generate the stripwise inhomogeneous magnetic field during annealing, the following especially simple technique has been devised. On a flat plate, for example a glass plate, is applied a thin film of a magnetically hard material, for example cobalt, in such a manner as to form parallel strips with the strip breadth and strip spacing approximately equal. FIG. 7 shows part of such a lined plate which will be designated a strip matrix in the following. The strip matrix has cobalt strips 20 between which are free strips 21. This strip matrix is magnetised to saturation in the Y direction by means of a powerful magnetic field perpendicular to the strips 20 and in the plane of the glass plate. In consequence of the remanence, an overall magnetisation of the strips 20 in the +Y direction remains after switching off the magnetising field. This is indicated by the arrows 22 in FIG. 7*a*. The stray fields of the cobalt strips produce the magnetic field represented in FIG. 7*b* in a plane directly above the matrix plane. Directly above the cobalt strips the field is in the opposite sense to the magnetisation vectors of FIG. 7*a*; over the spaces between strips of the same sense. If an external homogeneous magnetic field in the +X direction is superimposed on these stray fields, the field pattern shown in FIG. 7*c* results by vector addition. This has such a form as required in FIG. 6*b*.

The method for annealing the strips involves placing the film to be annealed directly on or a small distance from the strip matrix. By means of an additional homogenoeus direct filed in the X direction there is produced the inhomogeneous external magnetic field with the desired ripple angle $\beta$ at the place of the film. In the case of thicker films the desired ripple angle $\beta$ can extend up to 90° so that the additional homogeneous direct field in the X direction can be dispensed with, if only the film is magnetised before the annealing in one of the two easy directions. Film and matrix or film alone are then heated to more than 300° C. until the annealing is concluded. In order to protect the film the annealing can be carried out in a high vacuum.

With magnetic films annealed in accordance with this method there is a tolerance in the direction of the pulling field for setting up the blocking of up to ±10°. The pushing field can be up to 70% greater than a pulling field necessary for writing or reading. Only small limitations are therefore placed on the constancy and uniformity of the fields in the positive and negative hard directions.

With such a magnetic film pushing fields can be applied an indefinite number of times and with any length of duration of the individual pulses, without destruction of information taking place. The previously necessary condition of applying the pulling fields and pushing fields pair-wise is eliminated. It is therefore possible by using these films so to simplify the writing of information that a single $\pm H_y$ pulse is used instead of an impulse pair.

For many fields of application, the above described magnetic films and the previously described methods for writing and reading bits represent a marked improvement over the previous state of the art. However with the previously described magnetic films it is only possible to attain two-coordinate selection with difficulty and three-coordinate selection in general not at all. Another subsidiary aspect of the invention however allows the attainment of this.

If a magnetic thin film store is provided with differing strip-like closely adjacent regions which are oriented in the easy direction and if moreover care is taken that the energy barrier for the rotation of the magnetisation vectors from the positive easy direction to the negative easy direction is higher for strip-form regions of even number than for the interjacent strip-form regions of odd number, the magnetic thin film store assumes new characteristics which will be amplified in the following with reference to FIGS. 8 and 9. How such a magnetic thin film with such different strip-form regions can be obtained will be explained below.

FIG. 8 shows a thin magnetic film with strip-form adjacent regions 105 and 106. The magnetisation vector of the regions 105 with a lower energy barrier are indicated with a single arrow, those in regions 106 with higher energy barrier with a double arrow. FIG. 9 shows a phase diagram applicable to such a thin film store.

Let no field be applied to a "striated" thin magnetic film with the magnetisation vectors lying approximately parallel and pointing in the preferred direction which is annealed into the magnetic film. This is shown in FIG. 8*a*. If a field, whose field-vector has magnitude $H_s$ and points in the hard direction, that is to say in the *y*-direction, is applied as shown in FIG. 9, the magnetisation vectors in the strips 105 turn up nearly parallel to the field direction. The magnetisation vectors in the strips 106 can however not follow the field direction markedly. This can for example be caused by the de-magnetising effect of stray fields and will be explained subsequently. The magnetisation vectors therefore take up under the influence of the applied field a state which is shown in FIG. 8*b*. When the field is switched off again, all magnetisation vectors swing back into the easy, preferred direction, which on account of the combined effect of stray-fields, domain wall and anisotropy energy is the nearest energy minimum.

If the field vector $H_s$ is rotated into such a direction that it points for example into the cross-hatched region 107 of FIG. 9, all the magnetisation vectors of the strips 105 rotate or swing into a state with a negative X-component. The magnetisation vectors of the strips 106 again cannot follow the field since the field strength $H_s$ is too weak to carry these magnetisation vectors over the energy barrier which must be overcome in the rotation from the positive easy direction to the negative easy direction. These vectors therefore retain a component in the positive X-direction. The magnetisation vectors therefore take up a state as is shown in FIG. 8*c*.

If the field is switched off when the magnetisation vectors have the state shown in FIG. 8*c*, the magnetisation vectors mutually block each other again as in the already described case of an ordinary thin magnetic film with a preferred direction. They cannot therefore after the switching off swing back again into the easy preferred direction. This blocked Y-direction is therefore stable.

It is clear that the magnetisation vectors can also be blocked in the negative Y-direction, namely by means of a field whose field vector points into the cross-hatched region 108 of FIG. 9.

If it is required to rotate the magnetisation vectors from the blocked Y-direction into the positive X-direction again, a field is required whose vector points into the region 109 or 110 depending upon whether the magnetisation vectors are blocked in the positive or negative Y-direction.

If so large switching fields are used that the field vectors $H_s$ extend beyond regions 107 and 108 respectively, the energy barrier for the magnetisation vectors for the strips 106 also is passed so that these vectors also take up a component in the negative easy direction. Such field strengths extending beyond the regions 107 and 108 respectively will however not be used in the employment of a thin magnetic film with a preferred direction as a magnetic store, since by the use of such high fields information can be destroyed during read-out or write-in.

In FIGS. 10 and 11 is shown a thin magnetic film with strip-formed adjacent, differing regions, constituting one form of embodiment of the invention. FIG. 10 is a plan view, FIG. 11 a section through the film. The thin magnetic film which is shown in FIGS. 10 and 11 consists of a thin base film 115 which is applied to a substrate 116. On the base film 115 are applied webs, steps or strips 117 a certain distance apart and parallel to one another. All such substrates as are known for the usual magnetic thin film stores can be used with advantage as the substrate 116. The base film 115 can consist of a magnetically soft alloy of approximately 80% nickel and 20% iron or another material which finds application in the magnetic thin film stores customary to date. The strips 117 are also formed of a magnetic material. They can be formed of the same material as the base layer 115.

It is favourable to select a base layer 115 thickness between 150 and 350 A. Suitable values for the breadth of the strips lie between $3\times10^{-4}$ and $10\times10^{-4}$ cm. A favourable relationship between strip-breadth and strip spacing lies in the range between 1:2 and 1:5. The strip spacing should not however exceed 15 to $20\times10^{-4}$ cm.

If such a film is magnetised to saturation in the positive Y-direction, hence in a direction perpendicular to the strips, the magnetic flux in the film reaches $B_s.D$ in those those places where there are no strips 117, $B_s$ being the saturation flux density and D the thickness of the base layer. The magnetic flux in such sections of the film as include a strip 117 reaches however $B_s(D+d)$ in saturation where $d$ is the thickness or height of the strip 117. Such flux differences produce stray fluxes which run in the thinner-film regions in the positive Y-direction and in the thicker film regions in contrast in the negative Y-direction. These stray fluxes thus have in the thicker film regions a de-magnetising effect, that means they oppose the setting of the magnetisation vectors of the thicker film regions in the Y-direction and thereby make difficult the rotation of these magnetisation vectors from the positive to the negative easy direction. In order to rotate the magnetisation vectors in the thicker film regions from the positive to the negative easy direction, a higher energy barrier has to be overcome than is the case for the same rotation of the magnetisation vectors in the thinner film regions. This film therefore possesses the characteristics necessary to obtain the field diagram of FIG. 9.

In the thus-explained film, the different energy barriers of the individual strip-form regions are produced through demagnetising stray fields which are set up on account of differences from place to place in the magnetic saturation flux. These different saturation fluxes are caused in the case of the film of FIGS. 10 and 11 by cross-section variations. The same characteristics are also exhibited by films which are built up in strips of different materials which differ in their saturation magnetisations in the Y-direction.

A magnetic thin film store embodying the invention which exhibits such a construction is shown in FIG. 12. FIG. 12 is a schematic perspective view. There are alternating adjacent strips 118 and 119 which differ in their saturation magetisation. The easy and the hard directions in the storage element of FIG. 12 are shown by the two arrows. For simplicity the substrate for this thin magnetic storage element is not shown.

Another possibility for enhancing the energy barrier for the switching over of the strips 106 is to increase the uniaxial anisotropy of these strips 106 relative to the strips 105 in the strip direction. An increased uniaxial anisotropy is obtained for example if the magnetic material is vapour-deposited obliquely on to the substrate. When the vapour stream is obliquely directed elongated crystallites perpendicular to the vapour stream direction are formed. In the case of magnetic materials with not too strong a negative magneto-striction, a uniaxial anisotropy is set up in the direction of these crystallites. See (1) Smith, Cohen, Weiss, Journal of Applied Physics, Vol. 31, page 1755 (1960) and (2) Málek, Schüppel, Annalen der Physik (7), Vol. 6, pages 252 to 261 (1960). A similar effect is obtained if a non-magnetic material (e.g. copper) is first obliquely vapour deposited and then the magnetic material is vapour deposited perpendicularly. The magnetic material coats the elongated (copper) crystallites and takes up a uniaxial anisotropy (structural anisotropy) in the direction of the (copper) crystallites.

For a striated film copper strips must first be vapour deposited obliquely through a masking grid and moreover with a vapour stream direction which has a component perpendicular to the strips. The subsequently applied magnetic film then has an enhanced uniaxial anisotropy in the strip direction over places so treated.

Another method of obtaining different anisotropies would be to set up, by increasing the impurity atom concentration in the strips 106 and subsequently annealing in a magnetic field in the strip direction, an increase in the uniaxial anisotropy of these strips. The increase of impurity atom concentration can again result from vapour deposition of a very thin film through a masking grid with subsequent diffusion.

The common characteristic of all these methods is to be seen in the fact that, by suitable measures in the strip-form regions of one kind (the strips 106) an enhanced uniaxial anisotropy in the strip-direction is produced which essentially impedes the rotation in these strips of the magnetisation vector away from the easy direction (X-direction) compared with the strips 105. This increase of anisotropy can be caused by a different crystalline form or through stray fields in the strip-form regions of one kind which produce a de-magnetising effect, when the thin magnetic film with closely adjacent regions parallel to one another are subjected to a magnetic field whose direction is perpendicular to the parallel strips.

As already mentioned, the magnetic films embodying the invention are characterised in that not only the positive and negative easy directions, that is the X-directions, are stable directions of the magnetisation vector but also the positive and negative Y-directions. They can therefore be used to store bits as previously described. Since the last-mentioned thin films embodying this invention exhibit with respect to the films previously considered in use as storage elements especial advantages, their application as storage elements will be discussed. This will be done with reference to FIG. 9.

As already explained, such a storage element can have three different states. It can be "empty" or it can hold "0" or "1." In the "empty" state the magnetisation vectors of the film are orientated in the positive X-direction. The "1" state is represented by the blocked positive Y-state and the "0" state by the blocked negative Y-state of the magnetisation vectors of the film. In order to write information into the storage element, a field is applied to an empty storage element as above whose vector is suited in magnitude and direction to bring the magnetisation vector of the magnetic film into the blocked Y-state. When it is required to read out such information again the magnetisation vector of the film is swung by means of a suitable field back into the "empty" state, that is into the positive easy direction. This return swing induces a small voltage impulse in the read-out wire, which can be further operated upon.

As already still further described, for reading the command is first given to read out a "1." If no "1" is stored in the storage element, no impulse results in the read-out conductor from this command. Immediately thereafter the command is given to read out a "0." The two information possibilities, namely the possibility "1" and the possibility "0" are therefore not simultaneously tested, but one after the other. This appears from FIG. 4 in which the commands for reading are given by bipolar impulses. The positive impulse part serves to read a "1" and the negative impulse part to read a "0."

The fields which are necessary to act upon the magnetisation vectors of the film when writing in and reading out are usually generated by currents or current impulses sent through conductors which lie closely against the surface of the thin magnetic film. Since such a conductor normally travels across a plurality of storage locations which can all be in different states (empty, "1" or "0") it must for example be seen to that, when writing a "1" into an empty storage location, all those storage locations in which a "0" is stored remain uninfluenced. This means that a current impulse through these wires must firstly be large enough to be able to bring the magnetisation vector of the magnetic film from the positive easy direction, the "empty" state into the blocked positive Y-direction. It should however not be so large that the magnetisation vector of films which are blocked in the negative Y-direction is swung round into the positive blocked Y-direction.

Referring to FIG. 9, it is noticeable that in addition to the above-mentioned regions in this figure, other regions are indicated. When the field vector of the magnetic field which influences the thin film lies within the regions 111 shaded with oblique broken lines only reversible processes take place in the blocked films. This means the magnetisation vectors of the storage locations are influenced by the field to a certain extent but revert after switching off the field to that blocked state which they had before application of the field. If the vector of the applied field extends beyond this region 111, the stored information can be disordered or destroyed. This must be avoided.

If the field vector of the magnetic field extends into the region 107, as already stated, it brings the magnetisation vectors of the storage locations out of the empty state, that is out of the positive X-direction into the blocked Y-state, that is into the "1" state. The magnetisation vectors of storage locations which are in the "0" state, therefore being blocked in the negative Y-direction, are not influenced irreversibly by such a field.

The corresponding remarks obtain for magnetic fields whose field vector ends in the region 108. These are, as already said, necessary for obtaining the blocked negative Y-direction and thereby writing in a "0."

FIG. 9 shows that the field vectors of magnetic fields which are necessary for writing information into a storage location can have strong differences both in their direction and their strength, without the writing in process being prejudiced. This represents a great advantage over the thin magnetic films of prior construction, since in the previous stores a high precision of direction of the magnetic field had to be required for attaining the blocked Y-state. The blocked Y-direction is therefore especially stable in storage elements embodying this aspect of the invention.

For reading information out of a storage location, fields are necessary whose field vectors terminate in the regions 109 and 110. In order to be able to read a "1" as described above, that is in order to swing the magnetisation vector of the storage element from the blocked +Y-direction into the +X-direction without irreversibly influencing those magnetisation vectors which are blocked in the −Y-direction, the field vector of the reading field must project into the region 109. For reading a "0" without destroying a "1" a reading field is necessary whose field vector ends in the region 110. A field vector which ends in the region 112, swings round the magnetisation vectors of storage locations blocked in both the positive and the negative Y-direction. This is however to be avoided if the above described reading procedure is to be carried out.

In the region 113 partially reversible and partially irreversible magnetisation changes take place in the storage locations so that a determinate relationship between the direction of the magnetisation vector of the film and a stored item of information is no more possible.

If the thin magnetic film is to be used as a magnetic thin film storage in accordance with the present invention and the writing and reading techniques already described are to be used, magnetic fields are necessary for writing whose field vectors project into the regions 107 and 108 whilst for reading the magnetic field vectors must end in the regions 109 and 110. It is now advantageous if the necessary field vectors are compounded in accordance with the laws of vector addition from field vectors of component fields which in part are directed parallel or antiparallel and in part perpendicular to each other.

An example of this is given in FIG. 14.

FIG. 14 represents again a field diagram of a thin striated magnetic film embodying the invention. The designation of the regions is taken from FIG. 9. A steady magnetic field is applied to the film, pointing in the negative X direction and whose field vector possesses the magnitude $H_{xp}$. This field vector therefore terminates at the point $-H_{xp}$ on the $H_x$ axis. The magnetisation changes produced by this steady magnetic field are reversible since the vector terminates in the region 111 of FIG. 14. In order to write in a 1 or a zero in an empty storage location short impulse fields are necessary whose field vectors are aligned in the Y direction and which possess the magnitude $+h_y$ or $-h_y$. These short impulse fields can be generated by means of current pulses in conductors which are carried closely across the storage locations in the correct direction. This is described already above.

In order to effect read out there is applied simultaneously with the write impulse $h_y$ a read impulse $h_x$. These read impulses are again also produced by means of a short current impulse in a suitably directed conductor. As can be seen, the sum vector $(-H_{xp}+h_y+h_x)$ terminates in the region 109. Therefore as already made clear, a selective reading out of a 1 according to the reading technique already described is possible. The sum vector $(-H_{xp}-h_y+h_x)$ terminates as can be seen in the region 110. Therefore with this sum vector it is possible to read out a zero selectively.

The reading techniques so far described represent a 2-coordinate selection of information, that is, in order to select or read out the information two reading fields must act simultaneously on a storage element. This 2-coordinate reading technique can be easily transformed into a 3-coordinate reading technique if instead of a reading impulse of magnitude $h_x$ the sum of two similarly directed reading impulses of magnitude $h_x/2$ is used. This is shown in FIG. 15 which is again a field diagram and apart from the field vectors just indicated agress with FIG. 9. As can be taken from FIG. 15 it is possible thereby to read out information, that is, for the read out of a 1 to arrive in the region 109, only if all the component vectors add with one another, that is the fields with the field vectors $h_y$, $h_x/2$ and $h_x/2$ are simultaneously applied. The sum vector $(-H_{xp}+h_y+h_x/2+h_x/2)$ which is necessary for reading terminates in the region 109 only when all component fields are simultaneously provided. If only a single component field is lacking as can be easily ascertained from the drawing, the sum vector influences the magnetisation vectors of the storage locations only reversibly or hardly at all.

By means of this characteristic of thin magnetic films embodying the invention it is therefore possible to construct storage matrices having 3-coordinate selection, that is storage matrices for which three reading impulses must act simultaneously for the reading of a storage location. The circuit diagram of such a storage matrix is given schematically in FIG. 16.

The matrix of FIG. 16 consists of four planes each with 4 x 4 storage locations so that in all 64 storage locations are provided. Each storage element 125 is traversed by two vertical conductors 126′ to 126′′′′ and 127′ to 127′′′′ and a horizontal selection conductor 128′ to 128′′′′. By means of the horizontal conductors 128′ to 128′′′′ currents $+i_x$ generate the partial fields $\pm h_y$. By means of both the vertical conductors 126′ to 126′′′′ and 127′ to 127′′′′ currents of strength $i_y/2$ generates the component fields $h_x/2$. In order to select or read out the particular storage element indicated at 125′, currents of magnitude $i_y/2$ are sent through the conductors 126′′ and 127′ and an impulse pair of magnitude $\pm i_x$ is sent through the conductor 128′′′.

Only the selected dot 125′ will thus be re-magnetised in the positive X direction. In order to write in a 1 or a 0 a component current $+i_x$ or $-i_x$ can be sent finally only through the conductor 128′′′. There is also however the possibility of subjecting all elements to a field $+h_y$ or $-h_y$ by means of a current through a fourth conductor overlying all elements of the matrix. Only the previously read element will react to this field and have the information 1 or 0 written in.

Obviously, it is possible to use only the two impulse fields $h_x/2$, $h_x/2$ of the 3-impulse fields $h_x/2$, $h_x/2$, $h_y$ to give a coincidence for reading. This however takes one back to a 2-field coincidence which may however, be more reliable than the 2-field coincidence with orthogonal impulse fields $h_x$, $h_y$. A field $h_y$, in particular a bipolar impulse, can be used to assist the reading out. This impulse field $h_y$ can for example be applied to all storage elements of a matrix.

It should still be noted that with the last described magnetic storage element all reading and writing techniques can be carried out which have already been described. It is only necessary to take care that the storage elements are suitably pre-magnetised in the negative X direction as has already been described.

In conclusion, a method will be described which is suitable for the production of striated thin magnetic films having a ripple in the preferred direction. FIG. 17 shows the construction of a thin magnetic film which has been prepared for annealing in such a ripple.

On a sub-strate 201 is applied a thin film 202 of a magnetically soft material. The substrate 201 can consist of glass or mica or be made of any other desired material which has been used hithertofore as the base material for a thin magnetic film. The thin film 202 can, for example, be an alloy of 80% nickel and 20% iron. On the thin film 202 lies another film 203 which is soluble in a solvent such as will not affect the film 202 or the sub-strate 201. The film 203 can be produced from a water soluble material. It can for example consist of common salt.

On the film 203 are then applied strips 204 of a permanent magnetic material such as for example cobalt. This can for example be carried out by vapour deposition through a masking grid. The dimensions of these permanent magnetic strips are preferably selected in the manner which has already been indicated.

When a thin magnetic film has been prepared in this way and magnetised to saturation in the hard direction, that is in a direction perpendicular to the strips 204, the magnetic ripple can be annealed into the film sufficiently as described in the foregoing in conjunction with the annealing using a permanent magnetic strip matrix. The procedure during annealing need therefore be explained no further.

When the annealing procedure is over the whole thin magnetic film structure is placed in a solvent. The film 203 goes into solution, the strips 204 can no longer then stick on the film 202 and they separate off. As a result, a magnetic thin film store is obtained which consists only of the sub-strate 201 and the magnetically soft film 202 in which a magnetic ripple has been annealed in a simple manner.

It is clear that it is possible to influence the annealing of the ripple into the film 202 in dependence upon the distance between the film 202 and the strips 204, that is, in dependence on the thickness of the film 203. It is favourable to make the thickness of the film 203 no greater than $10^{-4}$ cm.

The sources of current impulses have not been shown in FIGS. 3 and 16 and moreover no details of these have been given since the construction and control of all such sources is fully understood by those versed in the art of computers.

We claim:

1. An information storage element comprising: a thin film of magnetic material having an easy preferred direction in the film plane and a hard direction transverse to the easy direction, and film being capable of assuming, additionally to the two stable remanence conditions in the easy direction, two further stable remanence conditions with a component of the magnetization in one or the opposite hard direction, conductors traversing said film, and means for applying pulses to said conductors to leave said film selectively magnetized in one sense and the other sense in the hard direction to represent binary 0 and binary 1 respectively.

2. An information storage element comprising:
a thin film of magnetic material having an easy preferred direction in the film plane and a hard direction transverse to the easy direction,
a first conductor traversing said film in the easy direction for generating fields in the hard direction,
a second conductor traversing said film in the hard direction for generating fields in the easy direction,
a read-out conductor traversing said film in the hard direction,
and means for applying pulses to said first and second conductors to leave said film selectively magnetised in one sense and the other sense in the hard direction to represent binary 0 and binary 1 respectively.

3. An information storage element comprising:
a thin film of magnetic material having a mean easy preferred direction in the film plane and a mean hard direction transverse to the easy direction, comprising a plurality of strip form regions parallel to said mean easy direction and the easy direction being deflected angularly from the mean easy direction alternately in one sense and the other from strip to strip,
conductors traversing said film,
and means for applying pulses to said conductors to leave said film selectively magnetised in one sense and the other sense in the hard direction to represent binary 0 and binary 1 respectively.

4. An information storage element comprising:
a thin film of magnetic material having an easy preferred direction in the film plane and a hard direction transverse to the easy direction,
said thin film comprising a plurality of closely adjacent strip form regions orientated in said easy direction,
said regions having alternately high and lower energy barriers with respect to rotation of the magnetisation vector through 180° from the easy direction in one sense to the other sense,
conductors traversing said film,
and means for applying pulses to said conductors to leave said film selectively magnetised in one sense and the other sense in the hard direction to represent binary 0 and binary 1 respectively.

5. An information storage arrangement comprising:
a thin film of magnetic material having an easy preferred direction in the film plane and a hard direction transverse to the easy direction,
conductors traversing said film,
means for applying a steady magnetic field to said film in a selected sense in said easy direction
and means for applying pulses to said conductors to leave said film selectively magnetised in one sense and the other sense in the hard direction to represent binary 0 and binary 1 respectively.

6. An information storage matrix comprising:
at least one array of thin film areas of magnetic material having an easy preferred direction in the film plane and a hard direction transverse to the easy direction,
at least two sets of crossing conductors traversing said thin film areas at the conductor intersections
and means for applying pulses to selected ones of said conductors to leave a selected film area magnetised selectively in one sense or the other in the hard direction to represent binary 0 and binary 1 respectively.

7. An information storage matrix according to claim 6, wherein the last said means are arranged, for effecting read-out, to apply pulses to selected conductors to bring the magnetisation of the selected film area only to the easy direction, leaving all other film areas in the positive or negative hard direction.

8. An information storage matrix according to claim 7, wherein said means are arranged, after read-out to apply a pulse of selected sign to a conductor traversing at least a plurality of film areas including said selected film in the easy direction, thereby to write a 1 or 0 into said selected film area only.

References Cited

UNITED STATES PATENTS

| | | | |
|---|---|---|---|
| 2,985,948 | 5/1961 | Peters | 29—155.5 |
| 3,068,554 | 12/1962 | Pouget | 29—155.5 |
| 2,910,673 | 10/1959 | Bloch | 340—174 |
| 2,934,748 | 4/1960 | Steimen | 340—174 |
| 3,030,612 | 4/1962 | Ruben et al. | 340—174 |
| 3,058,099 | 10/1962 | Williams | 340—174 |
| 3,258,752 | 6/1966 | Bradley | 340—174 |
| 3,298,005 | 1/1967 | Matick | 340—174 |
| 3,174,138 | 3/1965 | Matcovich et al. | 340—174 |
| 3,278,913 | 10/1966 | Raffel | 340—174 |
| 3,230,515 | 1/1966 | Smaller | 340—174 |

BERNARD KONICK, *Primary Examiner.*

P. SPERBER, *Assistant Examiner.*

U.S. Cl. X.R.

29—604; 117—212